United States Patent Office 2,930,083
Patented Mar. 29, 1960

2,930,083

EXTRUSION OF CROSS-LINKED POLYETHYLENE AND PROCESS OF COATING WIRE THEREBY

Joseph E. Vostovich, Bridgeport, and Carl A. Bailey, Fairfield, Conn., assignors to General Electric Company, a corporation of New York No Drawing. Application August 30, 1957
Serial No. 681,175

10 Claims. (Cl. 18—55)

This invention relates to a process for extruding cross-linked polyethylene; more particularly, the invention relates to a process for extruding cross-linked polyethylene as insulation on wire.

During the past five years there have been a number of investigations made into the cross-linking of polyethylene by means of high energy electron radiation. More recently, there has been a great deal of interest in the use of peroxides, such as di-α-cumyl peroxide, as cross-linking agents. Examples of patent applications assigned to the same assignee as the present application which have been filed to cover various aspects of cross-linked polyethylene are: Precopio and Gilbert Serial No. 509,387, filed May 18, 1955 (Patent No. 2,888,424, issued May 26, 1959), directed to chemically cross-linked polyethylene in which a number of different filler materials may be present; Precopio and Gilbert Serial No. 509,388, filed May 18, 1955, directed toward a number of different tertiary peroxides which may be used to achieve cross-linking of polyethylene; Safford Serial No. 550,834, filed December 5, 1955 (Patent No. 2,888,419, issued May 26, 1959) directed toward a cross-linked polyethylene containing an organopolysiloxane; Safford and Corrin Serial No. 554,627, filed December 22, 1955, directed toward a chemically cross-linked polyethylene containing a basic material as a stabilizer; and Cole Serial No. 561,937, filed January 27, 1956, directed toward a cross-linked polyethylene which is subjected to a milling operation prior to molding or extrusion.

The above-mention Precopio and Gilbert, Safford, and Cole applications were directed to cross-linked polyethylene compositions broadly rather than to compositions classifiable only as electrical grade materials. Although cross-linked polyethylene makes an excellent electrical insulation, serious problems have been encountered in its fabrication. For example, insulation is extruded on wire which is then subjected to an elevated temperature to bring about cross-linking or cure. Since polyethylene which has not been cross-linked has a rather low melting point, there is a tendency for the extruded polyethylene to become fluid when the temperature is raised for curing and the cure has not yet been effected. This problem can be solved by loading the polyethylene with a filler material to impart form stability at elevated temperatures; but fillers degrade the electrical properties as by lowering the electrical resistance of the insulation. The maximum amount of filler material which can be present without seriously affecting the electrical properties is less than 20% by weight and this is insufficient to impart the necessary form stability during the cure of extruded insulation.

One of the objects of this invention is to provide a cross-linked polyethylene which, after extrusion, will retain its form during an open steam vulcanization or cure.

Another object of the invention is to provide a cross-linked polyethylene suitable for electrical insulation which, after extrusion, remains form stable when subjected to open steam curing.

Another object of the invention is to provide a process for manufacturing wire having an extruded insulating layer of cross-linked polyethylene.

Other objects of the invention will become apparent from a perusal of the following specification which, briefly stated, is directed to a process for extruding polyethylene which comprises mixing with polyethylene up to 5 parts by weight of a guanidine per 100 parts of polyethylene and from 10% to 35% of the quantity of tertiary peroxide necessary for optimum cross-linking, curing this mixture to effect a gel structure therein, mixing therewith the remaining 65% to 90% tertiary peroxide together with up to 20 parts by weight of filler per 100 parts of polyethylene and up to 10 parts by weight of an organopolysiloxane per 100 of polyethylene to produce an extrudable composition, extruding said composition, and contacting the extruded product with steam at the curing temperature of the polyethylene compound.

In the above brief statement of the invention, a guanidine, a filler, and an organopolysiloxane are optional components. While the present invention is not directed particularly toward these optional components, it is desirable that all be present since each one confers desirable properties on the final product. Safford and Corrin Serial No. 554,627, cited above, pointed out that the presence of guanidines in peroxide cross-linked polyethylene makes it less sensitive to milling conditions that cause premature decomposition. It has been noted that guanidines actually increase the electrical resistance of the polyethylene thus enhancing its electrical properties. Precopio and Gilbert Serial No. 509,387, cited above, pointed out that fillers, such as silica, carbon black, alumina, and calcium silicate, increase the tensile strength and percent elongation of peroxide cross-linked polyethylene. Safford Serial No. 550,834, cited above, pointed out that a minor amout of an organopolysiloxane in filled polyethylene produces a more extrudable composition having a smoother surface. Thus, the properties conferred by the presence of guanidines, fillers, and organopolysiloxanes are all desirable when the cross-linked polyethylene is used as electrical insulation. However, it must be emphasized that electrical requirements, particularly in the case of fillers, limit the upper proportion level of the optional components set forth above.

The present invention may be used in conjunction with conventional machinery for forming wire having extruded insulation. This machinery consists of an extrusion apparatus or tuber having a controllably heated screw feed mechanism to which insulating compound may be introduced. As wire is drawn through the extrusion head of the tuber, highly viscous insulating compound is fed under pressure through a die surrounding the conductor and the insulated wire is then slowly passed through a long steam chamber which is maintained at a temperature sufficient to effect a cure of the insulation. The wire is then cooled and wound on a reel.

As an example of the operation of this invention, 100 pounds of polyethylene, 1 pound of diphenyl guanidine, and 12 ounces of dicumyl peroxide are added to a warm (220° F.) Banbury mixer which is then operated at a 220° F. temperature for four minutes. The temperature of the Banbury mixer is then increased to 325° F. for 15 minutes and further mixing at this elevated temperature produces sufficient cross-linkage to impart a gel structure. The mixture is then removed from the Banbury mixer and allowed to cool. If desired, it may be stored for extended periods of time.

As soon as it is desired to convert the gel mixture described above into an extrusion mixture, 10 pounds of finely divided calcium silicate and 5 pounds of dimethylpolysiloxane are added along with 3 pounds of dicumyl peroxide and the composition is mixed on a Banbury mixer maintained at a temperature of 220° F. for 4 minutes. The extrusion mixture thus produced is then introduced to an extrusion apparatus having a tuber maintained at approximately 235° F. As soon as the composition has been extruded on wire being drawn through the extrusion head, it is subjected to contact with steam at 250 pounds pressure in order to bring about the cross-linking or cure of the polyethylene. As the temperature rises during the final cure, the gel structure maintains the insulation in its extruded form. The insulated wire is then cooled in a water bath and wound on a reel.

It is to be emphasized that the temperatures set forth in the above example are merely representative. The initial temperatures in the Banbury mixer and tuber are at a level to impart proper viscosity without subjecting the mixture to a significant degree of cure. The final temperature in the Banbury—during which time the initial gel structure is produced—and the temperature in the steam chamber are sufficiently high to bring about cross-linkage. Obviously, other temperatures than those listed above would accomplish these results.

Alternatively, the mixtures produced in the above example could be passed from the Banbury mixer directly to a mill for further treatment at low temperature. In the case of the gel mixture, milling produces a finely textured structure and in the case of the extrusion mixture, milling gives close control of the consistency.

In the above example, a total of 3¾ pounds of dicumyl peroxide was used, the initial quantity added to bring about the gel structure being 20% of the total. More or less total peroxide may be used depending upon the properties which it is desired to impart to the final insulated wire and depending also on the quantities of guanidine, filler, and organopolysiloxane used. Dicumyl peroxide may be used in a proportion as great as 10 parts by weight of peroxide to 100 of polyethylene. In addition, the percentage of the total peroxide initially added in order to produce a gel structure may be varied from 10% of the total to as much as 35%. However, the 20% initial addition set forth in the above example is an optimum figure.

In the above working example, 1 pound of diphenyl guanidine was used along with 10 pounds of calcium silicate and 5 pounds of dimethylpolysiloxane. These proportions are optimum; however, it must be emphasized that the guanidine may be present in a proportion as great as 5 parts by weight per 100 parts of polyethylene, the filler may be present in a proportion as great as 20 parts by weight per 100 of polyethylene, and the organopolysiloxane in a proportion as great as 10 parts by weight per 100 of polyethylene.

The preferred embodiment of the invention is set forth in the above working example. Limits of the invention are clear from the Precopio and Gilbert, Safford, and Cole applications previously cited herein. For example, Precopio and Gilbert Serial No. 509,387 points out that silica, carbon black, alumina, and calcium silicate are satisfactory filler materials and of these calcium silicate is the most useful in the present invention. Carbon black is the least desirable since it has the most adverse effect on the electrical resistance of insulation in which it is incorporated. Safford and Corrin Serial No. 554,627 points out that aryl substituted guanidines are most useful in conjunction with cross-linked polyethylene and that within this class diphenyl guanidine and di-tolylguanidine are most useful although guanidines within the scope of the following formula are satisfactory:

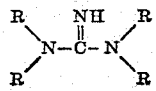

where R's, which may or may not be different, are selected from the group consisting of hydrogen and a hydrogen radical, for example alkyl, e.g., methyl, ethyl, butyl, isobutyl, octyl, etc. radicals; cycloalkyl e.g. cyclohexyl, cycloheptyl, etc. radicals; aryl e.g. phenyl, diphenyl, naphthyl, tolyl, xylyl, ethylphenyl, etc. radicals, and aralkyl, e.g. benzyl, phenylethyl, etc. These guanidines are also useful in the present invention.

While dicumyl peroxide is the preferred peroxide for achieving cross-linkage, other tertiary peroxides are satisfactory. As was pointed out in Precopio Serial No. 509,388, the tertiary peroxides of the present invention have the following formula:

where R and R', which may or may not be similar, are radicals selected from the group consisting of:

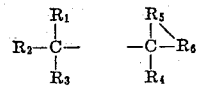

where $R_1$, $R_2$, $R_3$, and $R_4$ comprise alkyl radicals such as methyl, ethyl, propyl, butyl, pentyl, hexyl, heptyl, octyl, nonyl, decyl, undecyl, octadecyl, etc. and isomers thereof; cycloalkyl radicals such as cyclopropyl, cyclobutyl, cyclopentyl, cyclohexyl, cycloheptyl, cyclooctyl, etc.; alkylcycloalkyl radicals such as methylcyclobutyl, ethylcyclopentyl, tert-butyl-methylcyclohexyl, isopropylcyclohexyl, etc.; cycloalkyl alkyl radicals such as cyclopropylmethyl, cyclopentylethyl, cyclohexylpropyl, etc.; aryl radicals such as phenyl, biphenyl, naphthyl, anthracyl, etc.; alkaryl radicals such as tolyl, xylyl, ethylphenyl, tert-butylphenyl, phenylbiphenyl, ethylnaphthyl, tert-butylnaphthyl, propylnaphthyl, etc.; aralkyl radicals such as benzyl, phenylethyl, naphthylpropyl, etc. The unit

is a radical wherein the tertiary carbon attached to the peroxide oxygen is contained within a hydrocarbon cyclic radical structure such as cyclopropyl, cyclobutyl, cyclopentyl, cyclohexyl, cycloheptyl, etc., an example of which is diphenylcyclohexyl peroxide,

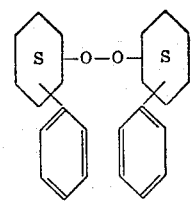

At least one member of the group consisting of $R_1$, $R_2$, $R_3$, $R_4$, $R_5$, and $R_6$ contains at least one aromatic group. Mixtures of these peroxides may also be used.

In addition, these peroxides may contain inorganic groups, such as halogens, nitro groups, etc., for example, chlorophenyl, bromophenyl, nitrophenyl, etc.

Although di-α-cumyl peroxide

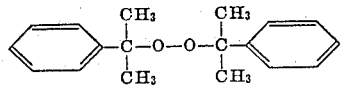

is the most preferred peroxide, other preferred peroxides are tert-butyl-α-cumyl peroxide

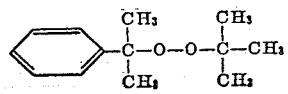

tert-butyltriphenyl methyl peroxide

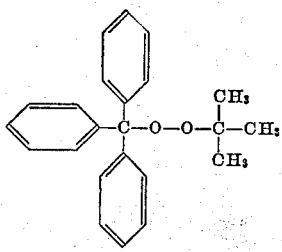

and di-α, p-cymyl peroxide

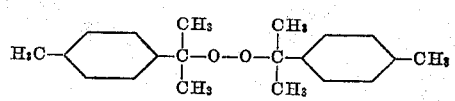

As pointed out in Safford Serial No. 550,834, the organopolysiloxanes employed in the present invenition are organopolysiloxanes curable to the solid elastic state. The curable organopolysiloxane or silicone compositions may be highly viscous masses, or gummy elastic solids, depending on the state of condensation, the condensing agent employed, the starting organopolysiloxane used to make the curable organopolysiloxanes, etc. Although these curable organopolysiloxanes are well known, for purposes of showing those skilled in the art the various organopolysiloxanes which may be employed in the present invention, attention is directed to the curable organopolysiloxanes disclosed and claimed in Agens Patent No. 2,448,756; Sprung et al. Patent No. 2,448,556; Sprung Patent No. 2,484,595; Krieble et al. Patent No. 2,457,-688; Hyde Patent No. 2,490,357; Marsden Patent No. 2,521,528; and Warrick Patent No. 2,541,137.

Curable organopolysiloxanes containing the same or different silicon-bonded organic substituents (alkyl, e.g. methyl, ethyl, propyl, butyl, octyl, etc.; alkenyl, e.g. vinyl, allyl, etc., cycloalkenyl, e.g. cyclohexenyl, etc.; aryl e.g. phenyl, tolyl, xylyl, naphthyl, etc.; aralkyl, e.g. benzyl, phenylethyl, etc.; halogenated aryl, e.g. chlorophenyl, dibromophenyl, fluorophenyl, etc.; cycloalkyl, e.g. cyclohexyl, etc.; alkynyl, e.g. ethynyl, etc.; both methyl and phenyl, etc. radicals) connected to silicon atoms by carbon-silicon linkages may be employed without departing from the scope of the invention.

The particular curable organopolysiloxane used may be any one of those described in the foregoing patents and is generally obtained by condensing a liquid organopolysiloxane containing an average of from about 1.9 to 2.1 silicon-bonded organic groups per silicon atom. The usual condensing agents which may be employed and which are well known in the art may include, for instance, acid condensing agents, e.g. ferric chloride hexahydrate, phenyl phosphoryl chloride, and the like; alkaline condensing agents, e.g. quaternary phosphonium hydroxides and alkoxides, solid quaternary ammonium hydroxides, potassium hydroxide, cesium hydroxide, etc. These curable organopolysiloxanes generally comprise polymeric diorganosiloxanes which may contain, for example, from 0 to 2 mol percent copolymerized monorganosiloxane, for example, copolymerized monomethylsiloxane. Generally, the preferred starting organopolysiloxane is one which contains 1.98 to 2.01 organic groups, for example methyl, per silicon atom where more than about 90% of the silicon atoms in the polysiloxane contain 2 silicon-bonded dialkyl groups. Dimethylpolysiloxane is a readily available organopolysiloxane and, therefore, is preferred for use in the present invention.

From the foregoing specification, it is obvious that many variations may be made without departing from the spirit of the invention. Therefore, it is the intention that the invention be limited in scope only as may be necessated by the scope of the appended claims.

What we claim as new and desire to secure by Letters Patent of the United States is:

1. A process for extruding polyethylene which comprises mixing with polyethylene from 10% to 35% of the quantity necessary for optimum cross-linking of a peroxide in which each of the peroxide oxygens is linked directly to a tertiary carbon atom whose remaining valences are attached to radicals selected from the group consisting of alkyl, cycloalkyl, alkyl cycloalkyl, aryl, and aralkyl, curing said mixture to effect a gel structure therein, mixing therewith the remaining 65% to 90% of said peroxide, extruding said composition, and contacting the extruded product with steam at the curing temperature to effect the cure thereof.

2. A process as claimed in claim 1 wherein up to 5 parts by weight of a guanidine per 100 parts of polyethylene are present in the mixture at the time the peroxide is initially added, up to 20 parts by weight of filler per 100 parts of polyethylene are added to the gel, and up to 10 parts by weight of an organopolysiloxane per 100 parts of polyethylene are added to the gel.

3. A process as claimed in claim 2 wherein 1 part by weight of a guanidine per 100 parts of polyethylene is present in the mixture.

4. A process as claimed in claim 2 wherein the organopolysiloxane is present to the extent of 5 parts by weight of the polyethylene.

5. A process as claimed in claim 1 wherein 20% of the peroxide necessary for optimum cross-linking is present prior to formation of the gel and the remaining 80% is added in preparing the extrudable composition.

6. A process as claimed in claim 1 wherein the filler is calcium silicate.

7. A process for making wire insulated with cross-linked polyethylene which comprises mixing with polyethylene from 10% to 35% by weight of the quantity necessary for optimum cross-linking of a peroxide in which each of the peroxide oxygens is linked directly to a tertiary carbon atom whose remaining valences are attached to radicals selected from the group consisting of alkyl, cycloalkyl, alkyl cycloalkyl, aryl, and aralkyl, curing said structure to effect a gel structure therein, mixing therewith the remaining 65% to 90% of said peroxide, extruding said composition as insulation on a conductor, and contacting the insulated conductor with steam to effect the cure of said extruded insulation.

8. A process as claimed in claim 7 wherein up to 5 parts by weight of a guanidine per 100 parts of polyethylene are present in the mixture at the time the peroxide is initially added, up to 20 parts by weight of a filler per 100 parts of polyethylene are added to the gel, and up to 10 parts by weight of an organopolysiloxane per 100 parts of polyethylene are added to the gel.

9. A process as claimed in claim 7 wherein 20% of the peroxide necessary for optimum cross-linking is present prior to the formation of the gel and the remaining 80% is added in preparing the extrudable composition.

10. A process as claimed in claim 8 wherein 1 part by weight of a guanidine per 100 parts of polyethylene is present in the mixture.

References Cited in the file of this patent

UNITED STATES PATENTS

| | | |
|---|---|---|
| 2,322,483 | Stricklen | June 22, 1943 |
| 2,528,523 | Kent | Nov. 7, 1950 |